Nov. 7, 1933.     A. W. BRUCE     1,933,541
VENTILATING AND HEATING SYSTEM AND METHOD
Filed June 22, 1931    3 Sheets-Sheet 1

Nov. 7, 1933.  A. W. BRUCE  1,933,541
VENTILATING AND HEATING SYSTEM AND METHOD
Filed June 22, 1931   3 Sheets-Sheet 2
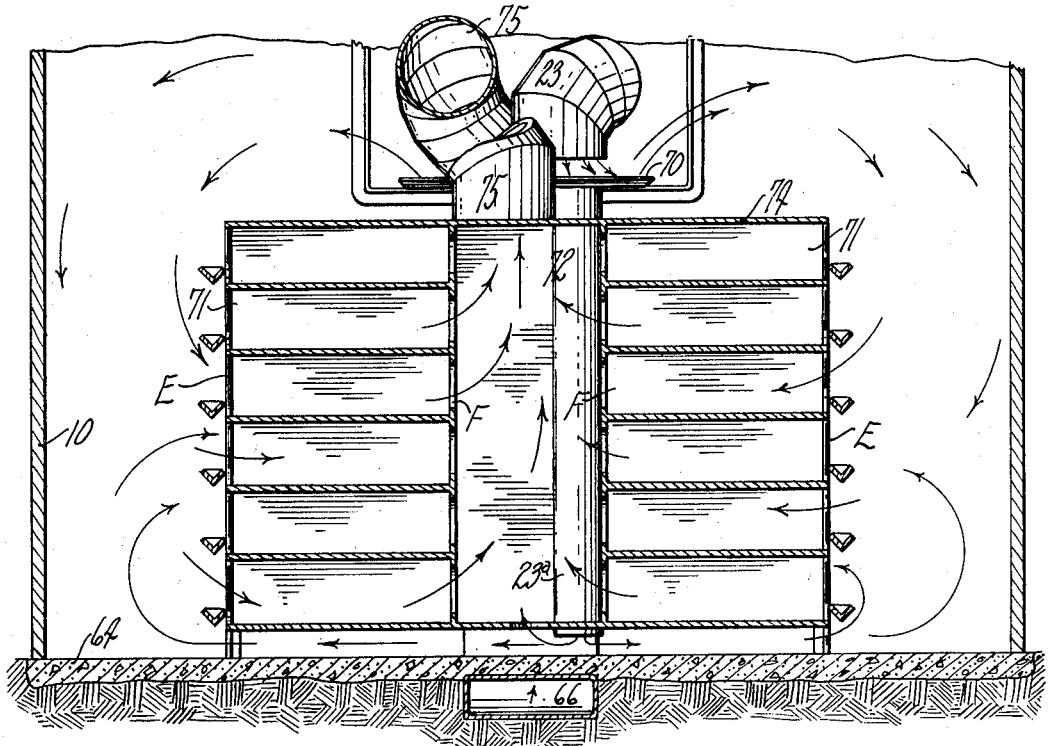
Fig. 2.
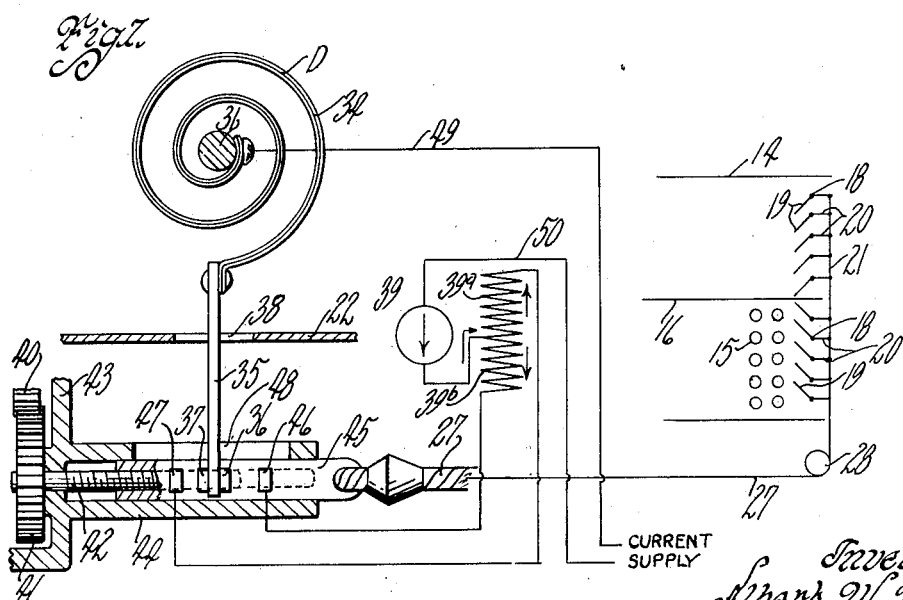
Witness
Edw. Seeley
Inventor
Albert W. Bruce
by Bair, Freeman & Sinclair
Attorneys

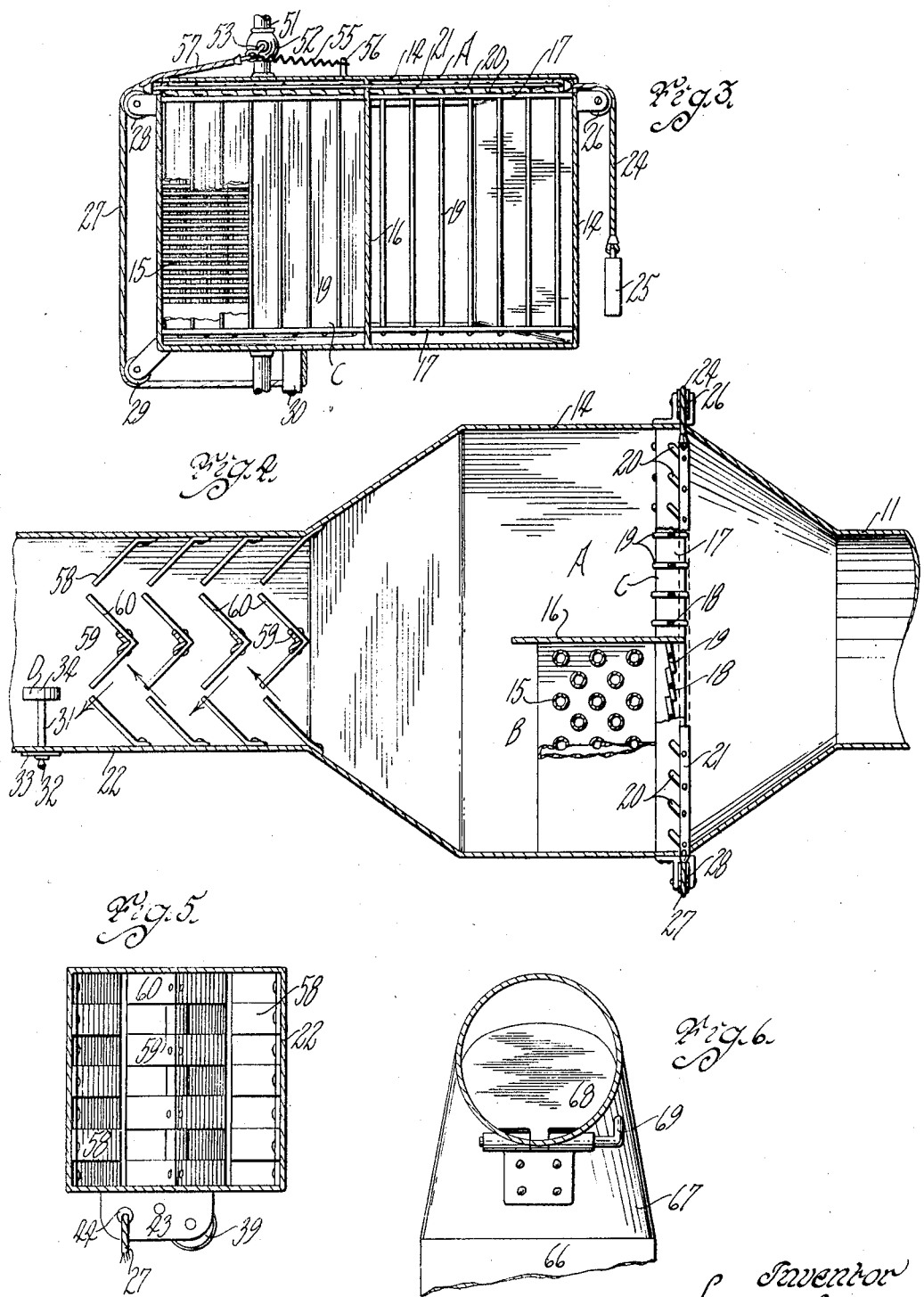

Patented Nov. 7, 1933

1,933,541

UNITED STATES PATENT OFFICE 1,933,541

VENTILATING AND HEATING SYSTEM AND METHOD

Albert W. Bruce, Ottumwa, Iowa

Application June 22, 1931. Serial No. 546,059

4 Claims. (Cl. 236—13)

The object of my invention is to provide a ventilating and heating system and method adapted for controlling air in a room, compartment, brooder house or the like.

More particularly, it is my object to provide means and a method for supplying to a compartment or room or the like a continuous predetermined supply of air at a predetermined temperature.

With this general object in view, it is my purpose to provide mechanism and a method by which a constantly maintained volume of fresh air may be supplied to a compartment, a brooder or the like, and likewise to provide means and a method whereby the air so supplied may be properly heated for maintaining a uniform or predetermined temperature in the incoming air.

Still another object is to provide a system for heating incoming air including means for dividing the air so that a part thereof will be subjected to the action of a heating means and a part will not, the streams of air being thereafter again reunited, the relative proportions of air diverted to the two streams being regulated and determined by the temperature of the reunited stream.

Another purpose is to provide a suitable air mixer for the streams mentioned.

Still another purpose is to provide means by which the air supplied may be fresh air or re-circulated air or partly fresh air and partly re-circulated air.

A further purpose is to provide a system including forced air blowers or the like for the incoming and outgoing air.

Another object is to provide such a system whereby part of the incoming air is re-circulated and part is discharged entirely from the system after having been supplied to the compartment or room.

Another object is to provide special mechanism for adapting the general invention particular to use in a brooder house and for brooder purposes.

With these and other objects in view, my invention consists in the construction, arrangement and combination of the various parts of my ventilating and heating system and method and in the practice of my method, whereby the objects contemplated are attained, as hereinafter more fully set forth, pointed out in my claims, and illustrated in the accompanying drawings, in which:

Figure 2 is a detail, sectional view taken on the line 2—2 of Figure 1.

Figure 3 is a detail, sectional view taken on the line 3—3 of Figure 1.

Figure 4 is a horizontal, detail, sectional view taken on the line 4—4 of Figure 1.

Figure 5 is a vertical, sectional view taken on the line 5—5 of Figure 1.

Figure 6 is a vertical, sectional view taken on the line 6—6 of Figure 1; and

Figure 7 is a diagrammatic view illustrating the arrangement of the thermostat and motor and fan control structure.

Figure 1:
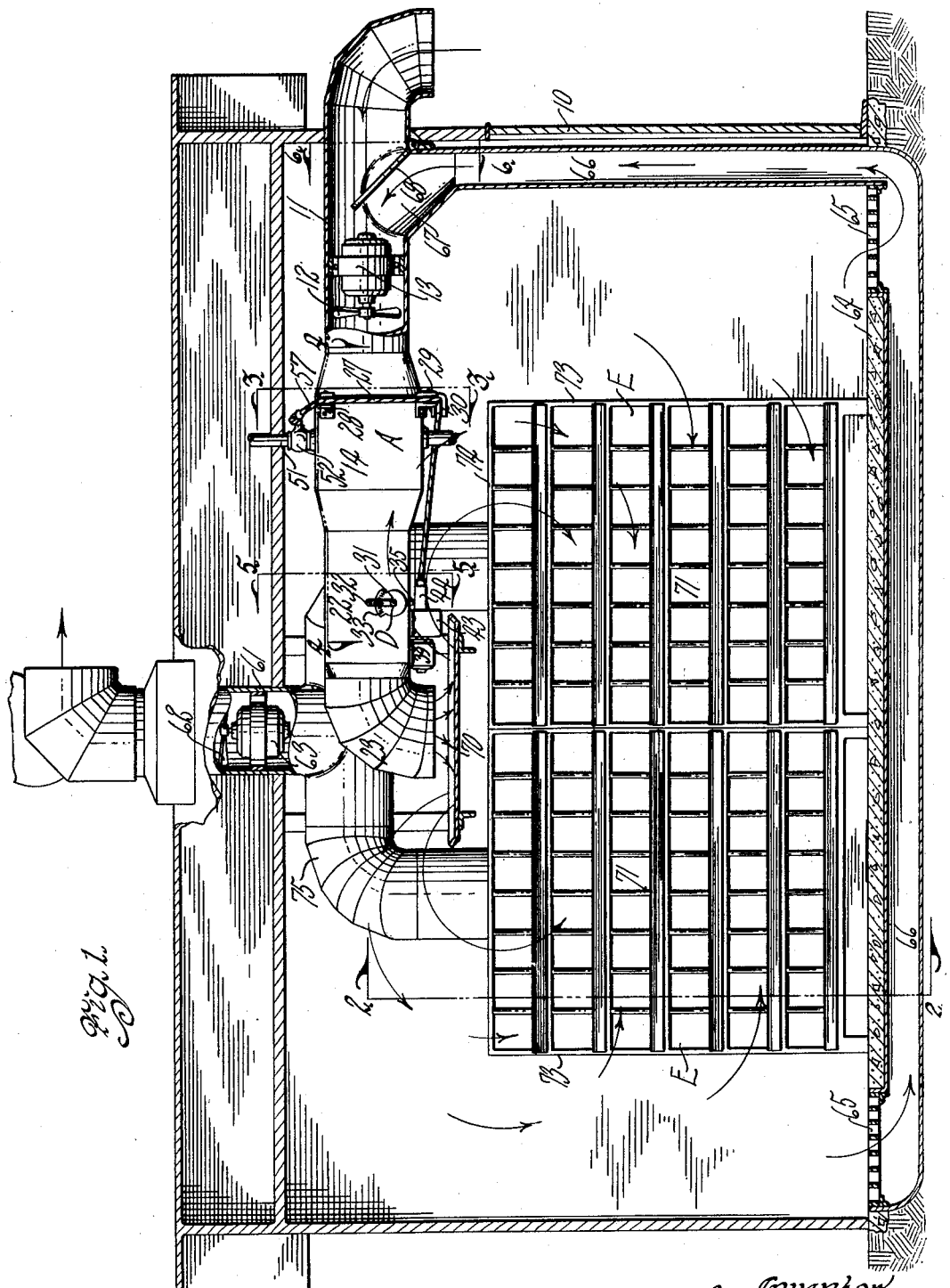
Figure 1 is a vertical, sectional view of a compartment or room equipped with a ventilating system embodying my invention and by which my method may be practiced.

It will be seen when my explanation is finished that my invention may be applied to a great variety of situations including the heating and ventilating of dwellings for humans, but for purposes of illustration, I shall describe it as applied to a brooder house for chickens or the like, but it is not my intention to be limited to use for heating and ventilating brooders.

I have found that one problem involved in affording proper ventilating and heating for fowls arises from the difficulty in furnishing to the birds enough fresh air and maintaining the air at a proper temperature without sudden undesirable variations. It is not hard to furnish sufficient fresh air, but it is hard to do it and heat it economically and always keep the air in the brooder house or brooder compartment at proper temperature.

It is not very difficult to maintain the temperature in a brooder or room or compartment at proper temperature but it is hard to do so and at the same time maintain a proper and particularly a constant flow of fresh air.

It is not sufficient in taking care of chickens or the like to keep the air at proper temperature.

It is highly important that a continuous inflow of fresh air in proper amount be afforded. These difficulties I have met by the structure and the method herein explained and claimed.

In the drawings herewith, I have used in reference numeral 10 to indicate generally a compartment, room, brooder house or the like.

Air supply system

I shall first describe the apparatus for maintaining a constant inflow of air to the room 10 and then refer to the air discharge structure and then to the special features shown here for a brooder house or the like.

I have shown in the drawings an inlet pipe 11 extending through the wall of the compartment 10. Arranged in the pipe 11 is a fan 12 operated from a motor 13 which may be placed within the pipe or elsewhere as desired. By means of the fan 12, the flow of air through the pipe 11 may be regulated and controlled.

Air is brought from the outside into the compartment through the pipe 11. The pipe 11 has within the building an enlarged portion or section 14. This enlarged portion 14 is for an important purpose.

*Heat and volume control for intake air*

If all of the incoming air were passed over a heating means, such as a radiator or heating unit of any other kind, it would be very difficult to control the temperature accurately because commercial heating units can not be instantly adjusted but are only adjusted slowly. So in order to permit the accurate control of the heating of the incoming air, I have provided this enlarged portion 14 and divided it into two or more passages indicated for instance at A and B, so that the incoming air may be divided into two or more streams, one of which passes through the passageway A and the other through the passageway B.

The heating unit 15 is in the passageway B.

I then provide means for accurately regulating how much air shall pass through the respective passageways, so that if more warm air is nedded, a greater proportion of the air is passed over the heater. If colder air is needed, a greater proportion of the air is passed through the passageway A.

The means for accomplishing this control of air flow comprises a damper structure C.

The passages A and B are separated by the partition 16.

The damper structure may vary considerably but it should be such as to accomplish the desired purpose.

As shown, I provide upper and lower horizontal frame members 17 extending across the enlarged portion 14 of the intake pipe. Journaled in these frame members 17 are regularly spaced upright rods 18. These rods carry the damper or shutter blades 19. At the upper ends of the rods 18 are provided the crank arms 20, all of which are pivoted to an operating bar 21 by which the shutters are simultaneously actuated.

The shutter blades 19 at the entrance of the passageway A and the shutter blades 19 at the entrance of the passageway B are so placed with relation to each other than when the shutter blades of the one passage are moved toward open position, the shutter blades in the other passage are moved toward closed position. As shown in Figure 4, the shutter blades 19 at the entrance of the passage B are closed and the shutter blades 19 at the entrance of the passage A are fully opened.

For convenience, I shall refer to these two sets of shutter blades as dampers.

After the streams of air leave the passages A and B they go through a mixing chamber 22 and thence are discharged through the pipe 23 into the compartment. The dampers are controlled according to the temperature of the air after it has been mixed in the mixing chamber.

Any suitable mechanism may be employed for controlling the dampers.

As shown for instance in Figure 3, the bar 21 is connected at one end to a cable or rope 24 to which is fastened a sufficiently heavy weight 25 for normally holding the bar at one limit of its movement, which as here shown, happens to be the limit where the damper blades for the passage A are closed and those for the passage B are open.

The rope or cable 24 is for convenience trained over the pulley 26.

The other end of the bar 21 is connected with a cable or the like 27 trained over pulleys 28, 29 and 30 (see Figures 1 and 3).

A temperature responsive device D is arranged in the path of travel of the reunited air so as to act according to the temperature thereof after the air has been reunited and mixed. This temperature responsive device includes a shaft or rod 31 journaled for instance in the wall of the mixing chamber 22. On the outer end of the rod 31 is a handle 32 (see Figures 1 and 7).

The handle 32 is preferably somewhat resilient and cooperates with a ribbed sector 33 to make it possible to adjust the rod 31 rotatably for adjusting the temperature responsive device.

A bimetal bar structure 34 has one end fastened to the rod 31 and is then coiled in a spiral and carries at its other end a bar 35 on the opposite sides of which are the contacts 36 and 37. The bar 35 projects through an elongated slot 38 in the wall of the mixing chamber 22. This is preferably the bottom wall.

Suitably mounted is a small motor 39 (see Figure 1), the shaft of which is connected with a pinion 40 (see Figures 1 and 7). The pinion 40 meshes with the pinion 41 on the shaft 42 journaled in the wall of the gear casing 43 and projecting into the casing 44.

In the casing 44 is slidably mounted but non-rotatably mounted, a bar 45 connected with one end of the rope 27. The bar 45 has the laterally projecting spaced contact points 46 and 47.

The bar 35 projects through a slot 48 in the wall of the casing 44 and the parts are so arranged that the contact points 36 and 37 coact with the contact points 46 and 47 when the thermal bar 34 is operated by variations in temperature in the incoming mixed stream of air.

The contacts and other parts are arranged in circuit as follows:

The motor 39 as shown in the diagram in Figure 7 has two field windings 39a and 39b wound in opposite directions, so that by sending the current through one, the motor is operated in one direction and by sending the current through the other, the motor is reversed and operated in the other direction.

The bar 35 and the contacts thereon are electrically connected with the rod 31, which is in turn connected with the current supply wire 49. The other current supply wire 50 is connected with the motor.

The winding 39a is connected with the contact 47 and the winding 39b with the contact 46.

The parts are arranged so that when the temperature of the mixed air passing the thermal bar 34 goes below the predetermined degree, then the bar 35 is actuated to cause the contacts 36 and 46 to engage. Thereupon a circuit is closed through the winding 39b of the motor, which is operated to rotate the pinions 40 and 41 and the shaft 42. The shaft 42 being threaded into the bar 45 moves that bar to the right (viewing it as shown in Figure 7), thus permitting the weight 25 (Figure 3) to pull the bar 21 for tending to open the blades 19 controlling the entrance of the passage B and to close the blades 19 controlling the opening into the passage A. Thereupon a greater proportion of the incoming air will pass over the heating means 15 and be warmed.

The apparatus is so arranged as to give very close and accurate adjustment.

It will be observed that the action of the motor and the rotation of the shaft 42 in moving the bar 45 to the right as mentioned moves the contact 46 away from the contact 36, so that only a very slight adjustment of the damper blades is made. If, however, that adjustment is not sufficient to warm the air enough, then it is obvious that the thermal device will move the contact 36 farther until it again engages the contact 46 whereupon the action above described is repeated and the damper blades will be farther actuated for causing more air to pass through the heated passage B and less air to pass through the unheated passage A.

Similarly if the mixed air is too warm for the desired predetermined temperature, the bar 35 will be moved to the left from its position shown in Figure 7 and will cause the contacts 37 and 47 to engage. Thereupon a circuit will be closed through the winding 39a of the motor and the motor will be operated in a direction opposite to that of its previously described motion for rotating the pinions 40 and 41 and the shaft 42 for moving the bar 45 to the left and thus actuating the damper blades so as to move those controlling the passage B toward closed positoin and those controlling the passage A toward open position.

Thereupon a smaller proportion of the air will be subjected to the action of the heating unit, and this operation will be repeated if the air does not immediately cool down to the desired temperature.

Provision is also made for controlling the supply of the heating element, steam, hot air or the like, to the heating unit 15.

In the heat element supply pipe 51 is a valve 52, having a controlling arm 53. A spring 55 connected with this arm and with a rigid post 56 on the wall of the enlarged chamber 14 tends to normally hold the valve closed. A rope or the like 57 is connected with the arm 53 and with the rope 27 as shown in Figure 3, so that the action of the rope 27 for moving the damper blades for getting hotter air serves to open the valve for supplying more hot air, steam or the like to the heating unit. Similarly when the bar 21 is moved in the opposite direction, the valve 52 is permitted to move toward closed position.

However the control alone of the supply of heating medium does not give quick enough and accurate enough variation in the temperature of the incoming air.

A mere variation in the amount of steam for instance supplied to the heating unit 15, while it will ultimately raise or lower the temperature of the incoming air does not control it with sufficient accuracy and speed. I have therefore provided in addition to the heat control, the control of the air through the two passages A and B and by this means I have found that I can maintain a predetermined temperature with far less variation from the ideal desired, than has heretofore been possible by any mechanism or method of which I am aware.

*The mixer*

I have found that when air is separated into streams and is then united, it is very desirable to thoroughly mix the two streams if uniform temperature in the air delivered to the compartment is desired.

Without the mixing, the air tends to come in two streams, one colder than the other, and immediately to seek different levels in the compartment.

In order to avoid this tendency of the air to reseparate when entering the compartment, I have provided a mixer. The mixer may be of any desired construction. As shown, it comprises baffle devices, perhaps best illustrated in Figures 4 and 5.

Secured to each side wall on the interior thereof within the mixing chamber, I provide a series of vertically spaced rows of baffle plates 58. Arranged centrally of the mixing chamber is a row of upright, rigid angle bars 59 to which I secure a series of vertically spaced rows of V-shaped baffles 60. The rows of baffles 58 are arranged opposite each other and are staggered vertically with relation to the rows of baffles 60. Thus the air passing on a horizontal line through the mixing chamber will travel somewhat as indicated by the arrows in Figure 4 and will be thoroughly mixed.

Fresh air from outside the compartment will be drawn in through the pipe 11.

The volume of air movement will be largely regulated by means of the fan 12, so that the amount of air supplied to the compartment may be accurately regulated.

I preferably provide a constant volume per minute.

The incoming air passes the damper blades 19 and is divided into two streams flowing through respective passages A and B. Where heat is necessary, one stream of air is heated by the heating unit 15. After the streams of air pass the partition 16, they are reunited and they flow into the mixing chamber 22 where they are thoroughly mixed. The relative amounts of air passing through the respective passages A and B are regulated according to the temperature of the air where it passes the temperature responsive device D.

The sector 33 may be graduated and marked for convenience in varying the temperature desired and the operation of the temperature responsive device may be regulated by rotating the rod 31.

By means of this mechanism, it is possible to supply to the compartment a predetermined volume of air per minute and to accurately control the temperature of the incoming air and thus control the temperature of the air in the compartment. The air flows from the pipe section 23 into the compartment.

*Air outlet*

I have shown leading from the room an air outlet pipe 61, in which there may be placed a fan 62 operated from a motor 63. The air discharged through the pipe 61 may be discharged to atmosphere or otherwise.

*Means for recirculation*

I preferably provide means for recirculating all or part of the air in the compartment where that is desired.

As here illustrated, I have shown the floor 64 of the compartment provided at widely spaced points with air outlet ducts 65 leading to an air conducting passage 66, which leads to and communicates with the pipe 11, as at 67 (Figure 1).

There is provided a damper valve 68 controlled by a handle 69 (Figures 1 and 6). The valve 68 may be moved to various positions for closing the pipe 11, so that only recirculated air is drawn into that pipe or for closing the passage 66, so that only fresh air is drawn through the system or to intermediate positions so that both fresh and recirculated air are used.

Where this system is used for dwellings, it is desirable to recirculate a portion of the air. This is also desirable in many brooder houses, especially where there is considerable space outside the brooders proper.

I have provided in the present instance for using my heating and ventilating system for brooder houses and will therefore describe certain additional structure employed in a brooder house.

*Brooder arrangement*

There is shown below the discharge end of the pipe 23 a large baffle plate 70 to prevent the discharge of warm air directly on the brooders. The pipe 23 in a brooder house installation is preferably arranged approximately above the middle of the brooders. As shown here, I have illustrated spaced tiers of brooders 71. The tiers are arranged in two rows with an open space 72 between them.

At what may be called the sides of the tiers, the walls of the respective units are continuous (imperforate) as indicated at 73 in Figure 1.

At the front and back, E and F, of each tier, air can pass in and out of the units and thus pass from the room or compartment through the brooder units and into the space 72.

The tops of the brooders are covered as indicated at 74.

A branch pipe 75 communicates with the space 72 through the top 74 and with the outlet pipe 61.

It is sometimes desirable that part of the air which has been heated to the desired temperature be conducted from the pipe 23 to a point near the floor of the building. For this purpose, I have provided a pipe 23a leading from the discharge end of the pipe 23 downwardly through the open space 72 for discharging a portion of the properly heated air below the brooder tiers as shown in Figure 2.

When the pipe 23a is employed, it will be seen that a portion of the air strikes the baffle plate 70 and is then directed outwardly and passes downwardly and thence through the tiers of brooders, while another portion passes downwardly through the pipe 23a to the floor of the building, and thence under the tiers of brooders outwardly and then upwardly through the brooders to the open space 72.

The pipe 23a is used wherever on account of the construction of the building in which the installation is made or of any other reason, it is desired to conduct the warm air more directly to the floor than where the pipe 23a is not used.

It will, of course, be understood that feeding batteries could be used instead of brooders in an arrangement of this kind.

*Operation*

I shall now describe the operation of my improved system and this will, of course, largely explain the method.

Assume the installation hereinbefore described and that birds are in the brooder units.

It will be understood that steam or hot air can be supplied to the heating unit 15 in the passage B for the incoming air.

Air will be drawn from atmosphere for instance through the outer end of the pipe 11 by gravity and also by the operation of the fans 12 and 62.

For the present, let us assume that the damper or valve 68 is in position for closing the passage 66. The air passes the damper blades 19 into the respective passages A and B, part of it in the passage B is heated, and the two streams of air then pass to the mixing chamber 22 and are thoroughly mixed.

The temperature of the responsive device D in the path of the mixed and warmed air is responsive to the temperature thereof.

It will, of course, be understood that the size of the passages and the speed of the fans is regulated for supplying the desired constant quantity of air to the compartment.

If the temperature for instance of the mixed air should get below that desired, then the thermal bar 34 will be actuated for moving the contact 36 into engagement with the contact 46. Thereupon a circuit will be closed through the winding 39b of the motor 39, as hereinbefore explained, and the motor will be operated for moving the bar 45 a slight distance so that the damper blades at the entrance of the passage B will be moved toward open position and the damper blades of the passage A will be moved toward closed position.

This same movement serves to slightly open the valve 52 for supplying more steam to the heating unit.

At the same time the contact 46 moves away from the contact 36 and if the very slight adjustment thus effected is sufficient for the purpose, no further change will be made.

If the temperature of the air affecting the element D is still too cool, the operation just explained is repeated and this is continued until the air is at the right heat.

If on the other hand, the air should become too warm, the thermal bar will operate to move the contact 37 into engagement with the contact 47 for closing a circuit through the winding 39a of the motor and moving the motor in the opposite direction for moving the bar 45 to the left (Figure 7) and thus closing the damper blades controlling flow of air to the passage B and opening those controlling flow of air to the passage A. Only a very slight variation is effected at first, but the operation is repeated automatically, so long as the incoming air is too warm.

I have thus found it possible to maintain a constant flow of air and also to control the temperature of this considerable volume of air within a very narrow range.

It has been found by experience that where the space around the brooder units is considerable, there is quite a good deal of air that is not breathed by the fowls and that can be profitably recirculated. For this and other reasons, I have provided the recirculating means.

It is, of course, also possible to filter and purify the air and to recirculate it as desired. It may in some instances be more economical to recirculate the air and purify and filter it than to take in atmospheric air.

It will, of course, be obvious that by varying the position of the damper or valve member 68, the relative proportions of atmospheric air and recirculated air may be regulated as desired.

My system as has been explained may be used for residences and a great variety of other purposes.

When used for brooder houses, I have found that it affords a highly efficient means for providing properly heated fresh air for chicks or other fowls.

While I have illustrated a structure for dividing the air into two streams, it should be understood that a larger number of streams may sometimes be advantageous. Generally speaking, the greater the number of streams the easier is the air mixed after part of it is heated.

I intend to cover by my claims any variations in structure or use of mechanical equivalents, which may be reasonably included within their scope and the scope of my invention.

I claim:

1. In a system of the kind described, an air supply duct, means for dividing a portion of said duct into separate air passages, a heater in one of said passages, adjustable means at the entrances of the respective passages for controlling the relative amount of air flowing into them, an air mixer in said duct for thoroughly mixing the air discharged from said passages, a temperature responsive element in the duct subject to action of the mixed air, means for moving air through the duct, and means for simultaneous actuating said air flow control means according to the condition of said element.

2. In a system of the kind described, an air supply duct, means for dividing a portion of said duct into separate air passages, a heater in one of said passages, adjustable means at the entrances of the respective passages for controlling the relative amount of air flowing into them, an air mixer in said duct for thoroughly mixing the air discharged from said passages, comprising baffles inclined inwardly from the walls of the duct in the direction of travel of air therethrough, and baffles spaced inwardly from said first baffles and having faces inclined outwardly and in the direction of travel of air in the duct, a temperature responsive element in the duct subject to action of the mixed air, means for moving air through the duct, and means for simultaneously actuating said air flow control means according to the condition of said element.

3. In a system of the kind described, an air supply duct, means for dividing a portion of said duct into separate air passages, a heater in one of said passages, adjustable means at the entrances of the respective passages for controlling the relative amount of air flowing into them, an air mixer in said duct for thoroughly mixing the air discharged from said passages, a temperature responsive element in the duct subject to action of the mixed air, means for moving air through the duct, means for actuating said air flow control means according to the condition of said element, a chamber into which said duct discharges, said duct having a fresh air inlet, a passage for conducting air from the chamber into the duct on the intake side thereof from said passages, and means for regulating the flow of air from the chamber into the duct.

4. In a system of the kind described, an air supply duct, means for dividing a portion of said duct into separate air passages, a heater in one of said passages, adjustable means at the entrances of said passages for controlling the relative amount of air flowing into them, an air mixer in said duct for thoroughly mixing the air discharged from said passages, a temperature responsive element in the duct subject to action of the mixed air, means for moving air through the duct, means for actuating said air flow control means according to the condition of said element, a chamber into which said duct discharges, said duct having a fresh air inlet, a passage for conducting air from the chamber into the duct on the intake side thereof from said passages, and means for regulating the flow of air from the chamber into the duct, the passage extending under the floor of said chamber and communicating with the passage from the room into said duct.

ALBERT W. BRUCE.